Figure 4:
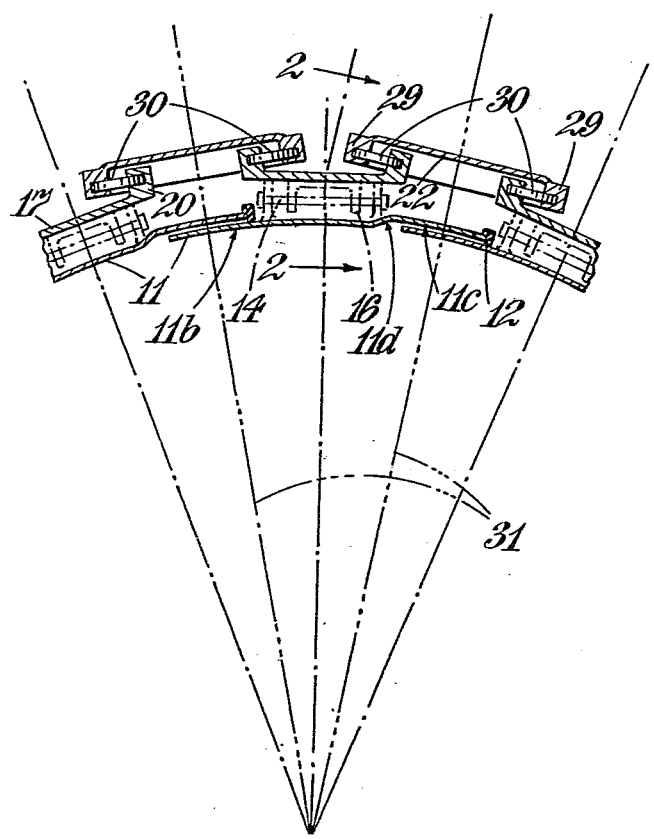

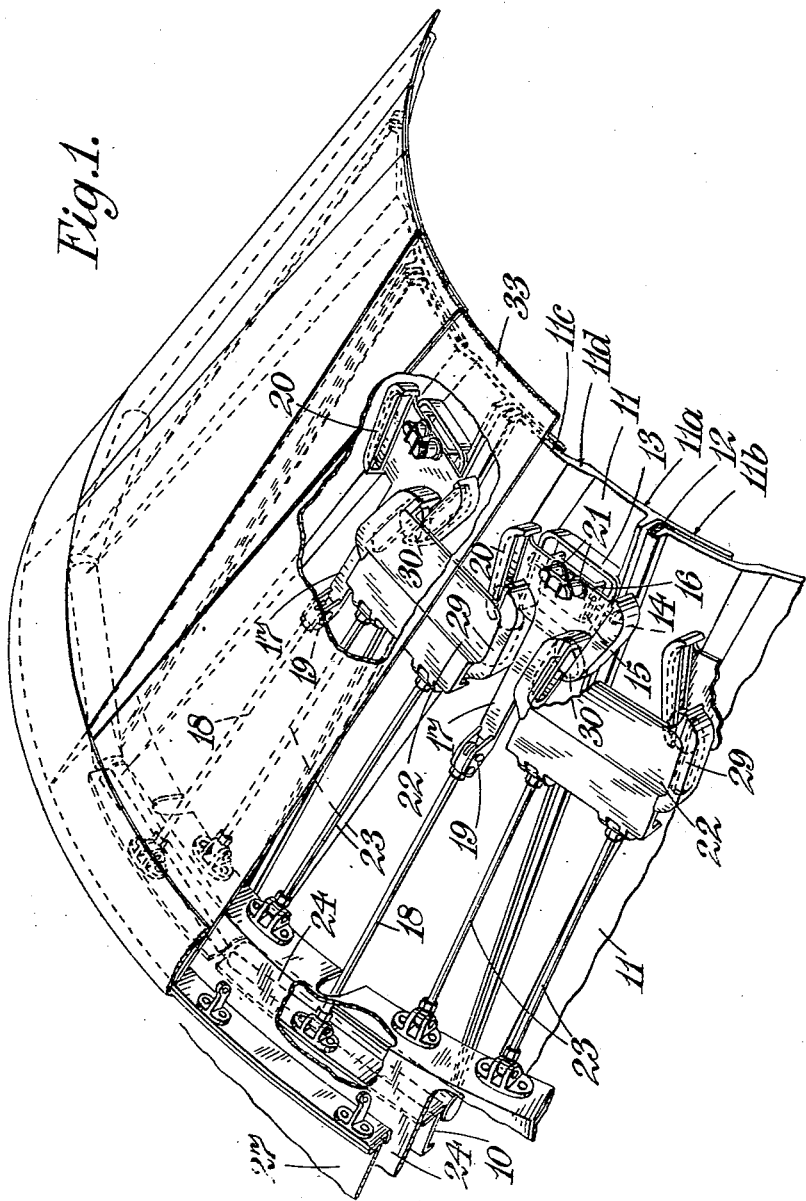

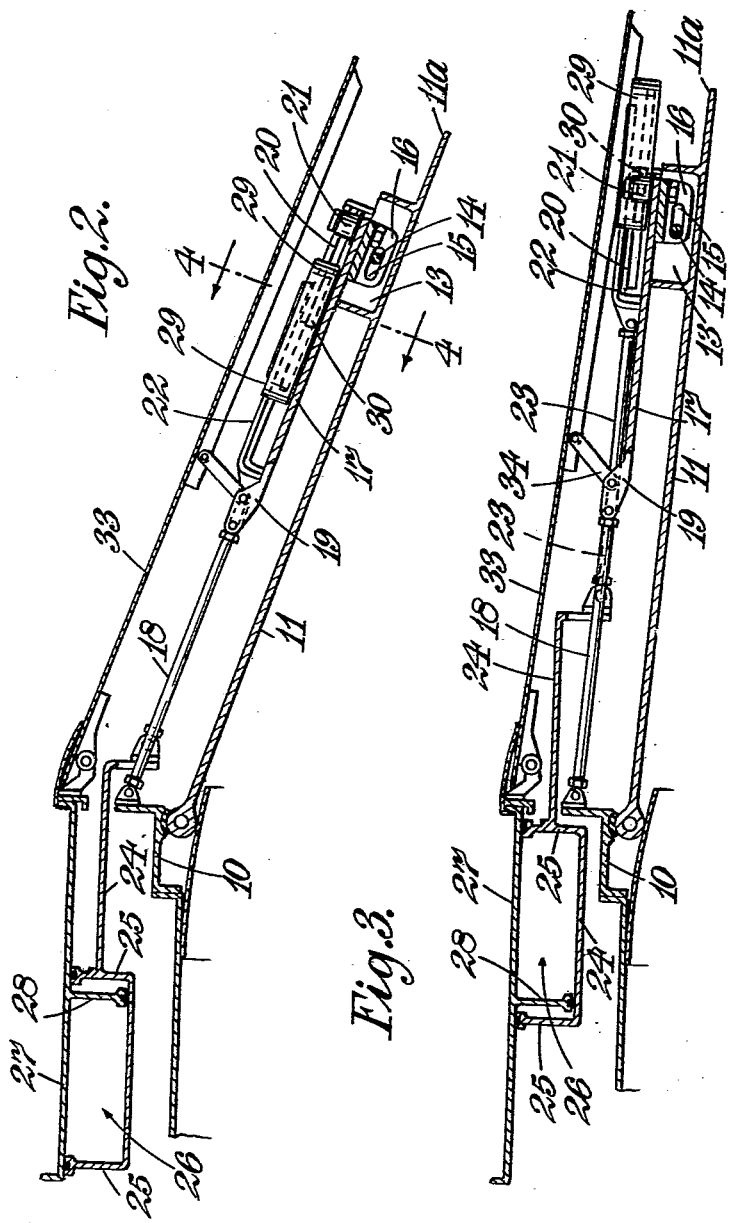

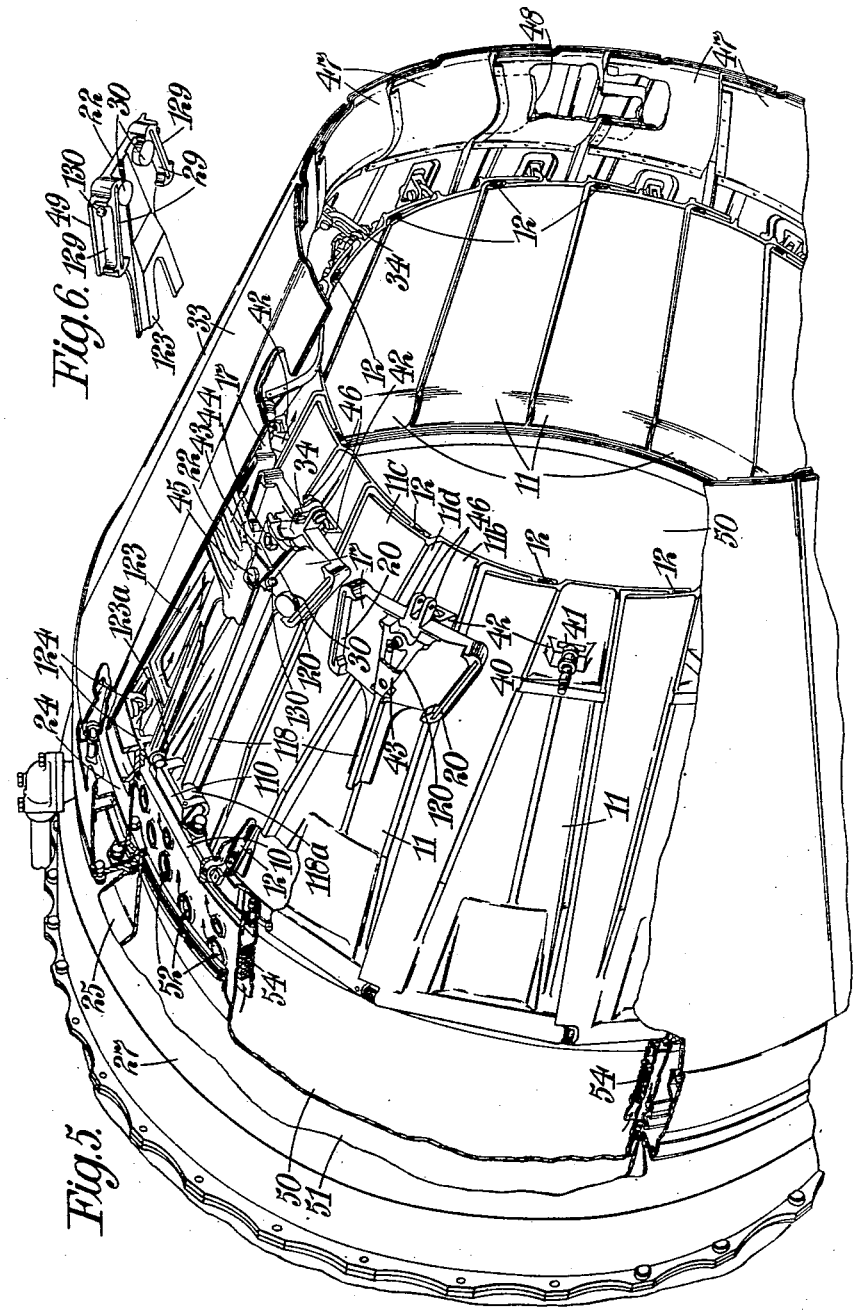

June 25, 1957  F. W. W. MORLEY ET AL  2,796,731
VARIABLE AREA JET PROPULSION NOZZLE
Filed Dec. 10, 1953  5 Sheets-Sheet 5

INVENTORS
F. W. W. MORLEY
+ A. A. RUBBRA
By Mawhinney & Mawhinney
ATTYS.

United States Patent Office 2,796,731
Patented June 25, 1957

2,796,731

VARIABLE AREA JET PROPULSION NOZZLE

Frederick William Walton Morley, Castle Donington, and Arthur Alexander Rubbra, Littleover, England, assignors to Rolls-Royce Limited, Derby, England, a British company Application December 10, 1953, Serial No. 397,354

Claims priority, application Great Britain December 16, 1952

17 Claims. (Cl. 60—35.6)

This invention relates to variable-area jet nozzles such as are used, for example, at the jet outlets of jet-propulsion gas-turbine engines, and the invention has for an object to provide a construction of variable-area jet nozzle of compact design.

According to the present invention a variable-area jet nozzle comprises a plurality of arcuate flap members which are arranged in overlapping circumferential juxtaposition to form an annular wall and which are arranged to extend in the direction of gas flow through the nozzle and are pivotally mounted at their upstream ends, and wedge means including a first pair of elements, one on each of a pair of adjacent flap members, and a second pair of elements, each element of said second pair being adapted to co-operate with one of said first pair of elements, said co-operating elements having circumferentially-facing co-operating surfaces, and means supporting said second pair of elements in circumferential relation, said second pair of elements being movable axially of the nozzle, whereby the circumferential distance between the elements of said first pair is varied to vary the nozzle area. The first pair of elements may co-operate with the second pair of elements through anti-friction means, such as balls or rollers provided between co-operating tracks to reduce friction, and the tracks may be formed by channelled pieces to accommodate the radial loads. Alternatively the tracks may be in the form of racks, and pinions may be provided between the pairs of co-operating racks.

The wedge means may be arranged to cause pivoting of the segmetal flap members in a direction to reduce the effective area of the nozzle outlet, reliance being placed upon gas pressures within the jet pipe to cause pivoting of the segmental members to increase the effective nozzle outlet area, or, as is preferred, the wedge means may be arranged to cause positive pivoting movement of the segmental flap members in both directions. The latter arrangement should be employed when it is required to increase the effective area of the nozzle outlet when there is no flow of exhaust gases through the jet nozzle; such opening of the jet nozzle may be required either for test purposes or before starting up a gas-turbine engine with which the jet nozzle is associated.

Figure 7:
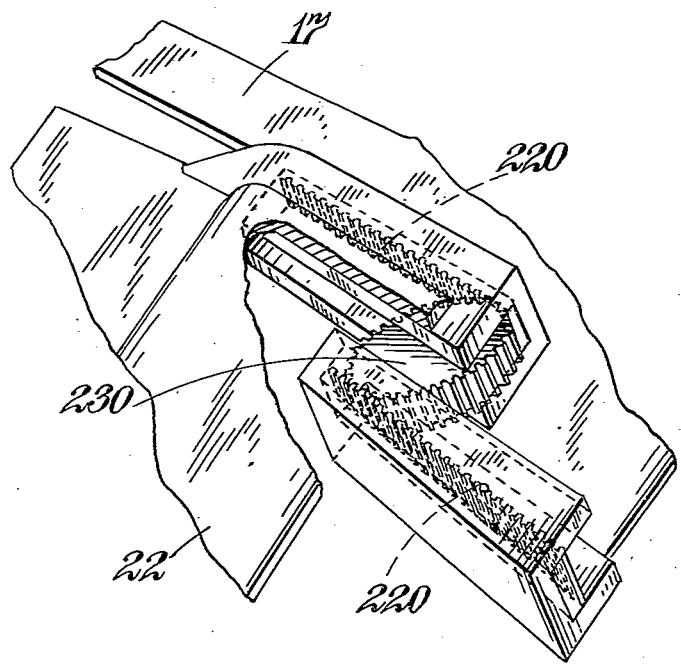

The embodiments of jet nozzle structure of this invention will now be described with reference to the accompanying drawings, in which:

Figure 1 is a perspective view of a part of the jet nozzle, parts of the structure being broken away to expose details of construction and the nozzle being in the closed position, Figure 2 is an axial section taken on the line 2—2 of Figure 4 with the nozzle in the closed position, Figure 3 is a view corresponding to Figure 2 with the nozzle segments in the open position, Figure 4 is a section on the line 4—4 of Figure 2, Figure 5 is a perspective view of another form of the nozzle, Figure 6 is a detail of part of Figure 5, and Figure 7 illustrates another feature.

The same reference numerals are used in the description of both forms of nozzle to indicate like parts.

Referring to the drawings, the jet nozzle arrangement comprises a ring 10 which forms the downstream end of the associated jet pipe and is fixed, and a plurality of arcuate flap members 11 (say eighteen) pivoted to the ring 10 in overlapping circumferential juxtaposition, the flap members being in the form of segments of an annulus so as together to form the wall of the downstream end of the exhaust duct passage. The flaps 11 in the position indicated in Figure 2 define by their downstream edges 11a the minimum effective area of the jet nozzle and in the position indicated in Figure 3 define the maximum effective area of the jet nozzle. The maximum effective area of the nozzle may in certain cases be determined by the ring 10.

As will be seen from Figures 1 and 4, each arcuate flap member 11 has a joggled circumferential section comprising a portion 11b of one radius, a second portion 11c of slightly greater radius and a circumferentially narrow interconnecting web 11d. With the nozzle flaps 11 in the position of Figure 2 the part 11c of each flap 11 overlies the marginal portion of the part 11b of the adjacent flap and the extent of overlap decreases as the flaps 11 are moved from the position of Figure 2 to the position of Figure 3. Each flap 11 carries at the edge of its portion 11c a sealing element 12 which co-operates with the outer surface of the adjacent part 11b to prevent leakage of exhaust gases from the nozzle through the gaps between the parts 11c, 11b.

The pivoting of the flaps 11 is effected in the illustrated construction in the following way.

Each flap has a rectangular flange 13 upstanding from its outer surface, and a bridge piece 16 is secured in the following manner to the flange 13 so as to permit relative sliding of the flap and bridge piece 16 lengthwise of the flap. The circumferentially-facing portions of the flange 13 are formed with aligned holes which are parallel to the pivotal axis of the flap, and the bridge piece 16 is formed with a pair of slotted radially-inwardly-extending flanges, the slots 15 being elongated in a direction at right angles to the pivotal axis of the associated flap 11. A pin 14 passes through the aligned holes and the slots 15. Each bridge piece 16 has secured on it a plate member 17 the upstream end of which is provided with a lug 19 to receive one end of a radius rod 18 the opposite end of which is pivoted on the ring 10 to rock about an axis parallel to but offset from the pivotal axis of the associated flap 11. As the flaps 11 move between the positions shown in Figures 2 and 3 so the pins 14 slide in the slots 15. It will be appreciated that if it is arranged that the radius rods 18 are pivoted effectively about the same axis as the flaps 11, the pin and slot means permitting relative sliding of the plate member 17 and the flap 11 may be omitted.

Each plate 17 carries at its circumferentially-spaced edges a pair of track elements in the form of channel members 20 and the pair of channel members 20 are disposed so that the tracks converge towards the pivoted end of the plate 17, and so that the tracks in the channel members 20 face one another.

The plate 17 may also have upstanding from its outer surface adjacent its downstream edge (and thus between the more widely spaced ends of the channel members 20) a pair of rollers 21 which rotate about substantially radial axes.

Each adjacent pair of flaps 11 has associated with them a saddle member 22, and each saddle member 22 is carried at the ends of a pair of radius rods 23 which are pivoted at their upstream ends to an annular piston member 24. The member 24 has at its upstream end an extension comprising a pair of flanges 25 affording between them an annular space 26 which is closed off by stationary structure 27 and divided into two pressure spaces by a flange 28 on the stationary structure. By supplying pressure fluid to one or the other of the pressure spaces the piston 24 and the saddle members 22 are moved simultaneously axially of the nozzle.

Referring now to Figure 4, it will be seen that each saddle member 22 is disposed radially outside an associated pair of flaps 11 and is symmetrical about a radial plane, and each saddle member 22 is provided at its circumferentially-spaced edges with a pair of chanel members 29, the channels of which afford tracks which converge in the downstream direction and face one another. The two channel members 29 co-operate with one channel member 20 of each of the two associated flaps 11, the track of one channel member 29 being close to and facing the track of the channel member 20 of one flap 11 and the track of the other channel member 29 being close to and facing the track of the channel member 20 of the next flap 11. A roller 30 is provided to run along the tracks of each pair of members 20, 29.

As will best be seen from Figure 4, the planes of the tracks in the channel members 29 of each saddle member 22 are formed by lines parallel to a radial line 31 drawn through the centre line of the saddle member 22 and the planes intersect on an axial plane containing the line 31; the planes of the tracks in the associated pair of channel members 20 are parallel to the co-operating tracks in the channel members 29 and so the channel members 20 face slightly radially outwards with respect to a radius through the centre line of the plate 17 carrying them.

The rollers 21 are disposed so that they can engage the rear surfaces of the adjacent channel members 29.

The structure also comprises outer flaps 33 pivoted to the stationary structure 27 by their upstream ends and they move with the flaps 11; the lugs 19 are connected by links 34 to the underside of the outer flaps 33.

The space between the inner flaps 11 and outer flaps 33 may afford the outlet for an annular air passage provided between the walls of a double-walled jet pipe to convey cooling air.

In operation, starting with the parts in the position of Figure 3, on supplying pressure fluid to the part of the space 26 on the left-hand side of flange 28, the annular piston 24 moves to the left, that is in an upstream direction, drawing the saddle members 22 with it and carrying the channel members 29 upstream relative to the channel members 20. Thus a load is transmtited from each saddle member 22 through the associated channel members 29, 20 and rollers 30 and pairs of plates 17 to each of the associated pairs of flaps 11, tending to draw the flaps 11 closer together circumferentially, and the resulting loads on the flaps 11 have radially-inward components (owing to the inclination of channel members 20) so that the flaps 11 swing inwards reducing the effective outlet area of the nozzle.

On supply of pressure fluid to the part of the space 26 on the right-hand side of the flange 28, the annular piston 24 moves to the right, that is in the downstream direction, and the flaps 11 are caused to pivot outwards from the position of Figure 2 to the position of Figure 3 due to any gas load in the jet pipe and due to the rear surfaces of the members 29 engaging the rollers 21 and producing a force which has a component tending to move the adjacent flaps 11 apart circumferentially and also a radially outward component which effects the pivoting of the flaps.

If no rollers 21 are provided, then the outward pivoting of the flaps 11 will depend on the gas loads on the flaps.

The rotational axes of the rollers 21 in the arrangement just described may be parallel to a radial line from the jet-pipe axis through the centre-line of the plate 17, but preferably the axes of the rollers 21 are inclined to this radial line by an angle equal to half the angle between the radial lines through the centres of adjacent flaps 11.

The axes of the rollers 21 will be inclined in a direction each towards the co-operating saddle member 22.

In the first-mentioned arrangement of the rollers 21 there will be theoretically point contact between the roller 21 and the co-operating surface of a member 29, and in the preferred arrangement mentioned there will be line contact.

Referring now to Figures 5 and 6, there is illustrated a nozzle arrangement which is generally similar in construction to that of Figures 1 to 4, but which differs in the details of construction of the arrangement.

In this construction the plate members 17 carrying the wedge tracks 20 of the flaps 11 are formed as castings. Each member 17 has an integral limb 118 extending forwardly therefrom and a boss 118a at the forward end of the limb 118 to be received between lugs of a bracket 110 to which the plate member is pivoted, the bracket 110 being secured to the ring 10.

Each plate member 17 has four tracks, two tracks 20 being used in closing down the nozzle and two tracks 120 being used in opening up the nozzle, each track 120 being parallel to the adjacent track 20.

Each plate member 17 is slidingly engaged with its associated flap 11 through a stud 40 having a flange 41 engaging an axially-directed guideway in a bracket 42 on the outside of the flap 11. The outer end of the stud passes through the plate member 17 and a keeper plate 43 to be secured by a nut 44, and a setscrew 45 is provided to lock the keeper plate 43 to the plate member 17.

Each plate member 17 has at its downstream end a pair of lugs 46 to which is pivoted the link 34 by which the plate member is connected with the corresponding outer flap 33.

Each saddle member 22 is also a casting formed with integral limbs 123 having bosses 123a at their forward ends by which the saddle member is pivoted in brackets 124 on the piston member 24. Each saddle member has four tracks as will best be seen from Figure 6, two tracks 29 being operative during closing down of the nozzle and two tracks 129 being operative during opening up of the nozzle. Each track 129 is parallel to its adjacent track 29.

Rollers 30 are provided to co-operate between the tracks 29 on the saddle members 22 and the tracks 20 on the plate members 17, and balls 130 are provided to co-operate between the tracks 120 and 129.

The saddle members 22 have circumferentially-directed lips 49 (see Figure 6) to retain the balls 130 in position, and the keeper plates 43 on the plate members 17 overlap these lips circumferentially to maintain the co-operating tracks 20, 29 and 120, 129 in engagement through the balls 130 and rollers 30.

The outer flaps 33 are of laminated form and have at their downstream ends inwardly-convex ejector lips 47, each of which is made as a sheet metal patch welded to the flap 33 and each of which is open at one of its circumferentially spaced ends and has a circumferential extension 48 at the other of its circumferentially spaced ends to project into the open end of the adjacent lip 47. The ejector lips 47 are provided to improve the ejector effect by which cooling air is drawn along the outside of the jet pipe and between the flaps 11, 33. The cooling air flows rearwardly through a space between the jet pipe 50 and an outer jacket 51 and leaves the space through rings of holes 52 in the rearward end of the jacket 51 into the space between the inner flaps 11 and outer flaps 33 thus cooling the flaps and the wedge means by which the flaps are moved.

A flexible sealing wall 54 in the form of a bellows piece is welded at its upstream end to the jet pipe 50 and is secured at its downstream end to the ring 10 which is secured to the downstream end of the jacket 51, so preventing penetration of hot gas into the cooling air flow path.

It will be appreciated that in this arrangement, when the piston 24 is moved to the right the flaps will be caused to pivot outwards by the action of tracks 129 on tracks 120 through balls 130 which tends to move adjacent flaps 11 apart circumferentially and also has a radially outward component which effects the pivoting of the flaps.

In an alternative arrangement, Figure 7, the tracks are each formed as a rack 220, and a pinion 230 is provided between each associated pair of racks. In this case the racks will be made of such length that the pinion does not become disengaged from the racks during relative movement of the racks.

We claim:

1. A variable-area jet nozzle comprising a plurality of arcuate flap members which are arranged in overlapping circumferential juxtapostion to form an annular wall and which extend in the direction of gas flow through the nozzle and are pivotally mounted at their upstream ends, and wedge means comprising a first pair of elements, one on each of a pair of adjacent flap members, and a second pair of elements, each element of said second pair being adapted to co-operate with one of said first pair of elements, said co-operating elements having circumferentially-facing co-operating surfaces the co-operating surfaces of each pair of elements being angularly disposed to define a wedge, and means supporting said second pair of elements in circumferential relation, said second pair of elements being movable axially of the nozzle, whereby the circumferential distance between the elements of said first pair is varied to vary the nozzle area.

2. A variable-area jet nozzle comprising a plurality of arcuate flap members which are arranged in overlapping circumferential justaposition to form an annular wall and which extend in the direction of gas flow through the nozzle and are pivotally mounted at their upstream ends, and wedge means including a first pair of elements, one on each of a pair of adjacent flap members, and a second pair of elements, each element of said second pair being adapted to co-operate with one of said first pair of elements, said co-operating elements having circumferentially-facing co-operating surfaces, antifriction means through which said second pair of elements cooperate with said first pair of elements, and means supporting said second pair of elements in circumferential relation, said second pair of elements being movable axially of the nozzle, whereby the circumferential distance between the elements of said first pair is varied to vary the nozzle area.

3. A variable-area jet nozzle arrangement as claimed in claim 1, wherein said co-operating surfaces of the elements are formed as racks and the elements co-operate through pinions.

4. A variable-area jet nozzle comprising a plurality of arcuate flap members which are arranged in overlapping circumferential juxtaposition to form an annular wall and which extend in the direction of gas flow through the nozzle and are pivotally mounted at their upstream ends, and wedge means including a first pair of elements, said first pair of elements comprising track elements one on each of the pair of adjacent arcuate flap members, the track elements converging towards the downstream end of the flap members, and a second pair of elements, each element of said second pair being adapted to co-operate with one of said first pair of elements, said co-operating elements having circumferentially-facing co-operating surfaces, said second pair of elements comprising track elements supported in circumferential relation by an axially-displaceable saddle member, said co-operating track elements being inclined outwardly with respect to the radial plane through them and through the nozzle axis, so that on axial movement of said saddle member a radial component of force is produced on each flap member, whereby axial movement of said saddle member causes the nozzle area to be varied.

5. A variable-area jet nozzle arrangement as claimed in claim 4, wherein each arcuate flap member carries a pair of track elements facing toward one another, inclined outwardly at a small angle to the radial plane, and diverging in the downstream direction, and there is provided a number of saddle members equal to the number of arcuate flap members, each saddle member comprising a pair of tracks, which are disposed to co-operate one with each of the adjacent, oppositely-facing tracks on an adjacent pair of arcuate members, and there is further provided an annular member which is displaceable axially of the nozzle and to which the saddle members are individually pivotally connected.

6. A variable-area jet nozzle arrangement as claimed in claim 5, wherein anti-friction means is provided between the co-operating tracks.

7. A variable-area jet nozzle arrangement as claimed in claim 5, wherein the arcuate flap members are provided with means to co-operate with the saddle members to effect positive pivoting of the flap members in a direction opposite to that produced by the co-operating track elements.

8. A variable-area jet nozzle arrangement as claimed in claim 7, wherein anti-friction means is provided between the co-operating tracks.

9. A variable-area jet nozzle arrangement as claimed in claim 5, wherein each track element is afforded by a channelled piece and roller elements are provided between the track elements to run in the channels.

10. A variable-area jet nozzle arrangement as claimed in claim 9, wherein the flap members carry rollers to co-operate with the backs of the channelled pieces on the saddle members, said rollers being arranged to rotate about axes so directed that a radial component of force is applied to the flap members in a direction opposite to that produced by co-operation of the track elements.

11. A variable-area jet nozzle arrangement as claimed in claim 5, wherein each pivoted flap member and each saddle member has two sets of co-operating track elements, one of said sets of track elements being adapted to effect inward pivoting of the flap members and the other set being adapted fo effect outward pivoting of the flap members.

12. A variable-area jet nozzle arrangement as claimed in claim 11, also comprising anti-friction means between the track elements of each set of co-operating track elements.

13. A variable-area jet nozzle arrangement as claimed in claim 11, wherein each saddle member has four tracks, two of said tracks being oppositely facing and co-operating with tracks on adjacent flap members and being disposed to produce an inward component of load on axial movement of the saddle members in one direction, and the remaining two of the track elements also being oppositely facing and co-operating with tracks on adjacent flap members and being disposed to produce an outward component of load on axial movement of the saddle members in the other direction.

14. A variable-area jet nozzle arrangement as claimed in claim 13, comprising also anti-friction means between each of said tracks on the saddle member and its co-operating track.

15. A variable-area jet nozzle arrangement as claimed in claim 1 comprising also outer flap members disposed outside and spaced from the arcuate flap members and arranged to pivot at their upstream ends about axes parallel to the axes of the arcuate flap members, the outer flap elements being connected to the arcuate flap members by links to pivot therewith.

16. A variable-area jet nozzle arrangement as claimed in claim 15, wherein the space between the arcuate flap members and the outer flap elements forms a cooling air flow path, means is provided to permit a flow of cooling air to said space, and the outer flap members are provided at their downstream ends with ejector lips to improve the ejector effect due to flow of exhaust gases through the nozzle arrangement.

17. A variable-area jet nozzle arrangement as claimed in claim 4, wherein anti-friction means is provided between the co-operating tracks.

References Cited in the file of this patent

UNITED STATES PATENTS

| | | |
|---|---|---|
| 2,496,509 | Wolf | Feb. 7, 1950 |
| 2,597,253 | Melchior | May 20, 1952 |
| 2,603,062 | Weiler et al. | July 15, 1952 |
| 2,634,578 | Kallal | Apr. 14, 1953 |
| 2,699,645 | Oulianoff et al. | Jan. 18, 1955 |
| 2,722,801 | Lombard | Nov. 8, 1955 |